United States Patent [19]
Von Starcke et al.

[11] 3,765,797
[45] Oct. 16, 1973

[54] IMPROVED ELECTROMAGNETIC CONVEYOR TROUGH

[75] Inventors: Axel Von Starcke, Remscheid-Luttring-Hausen; Surwolf Husmann; Hans-Erwin Gerbig, both of Remscheid; Friedrich Schnake, Rhein-Hausen, all of Germany

[73] Assignee: AEG-Elotherm GmbH, Remscheid-Hasten, Germany

[22] Filed: Apr. 6, 1972

[21] Appl. No.: 241,566

[30] Foreign Application Priority Data
Apr. 10, 1971 Germany.................. P 21 17 695.4

[52] U.S. Cl. ............................................. 417/50
[51] Int. Cl. ......................................... H02k 45/00
[58] Field of Search .................. 310/11; 417/50, 53

[56] References Cited
UNITED STATES PATENTS
| | | | |
|---|---|---|---|
| 3,534,886 | 10/1970 | Von Starck | 417/50 X |
| 3,632,229 | 1/1972 | Von Starck | 417/50 |
| 3,696,858 | 10/1972 | Senlen | 417/50 X |

Primary Examiner—William L. Freeh
Attorney—Cushman et al.

[57] ABSTRACT

An electromagnetic conveyor and method of operating it whereby a first inductor extends from a position below a liquid metal reservoir to a position beneath a chute ascending obliquely from the reservoir and a second inductor extends above the chute overlapping the first to the end of the chute. The field intensity of the overhead inductor is preferably adjusted to a fixed level sufficient to deliver liquid metal conveyed by the first inductor, and the fields intensity of the first inductor varied to control discharge.

5 Claims, 2 Drawing Figures

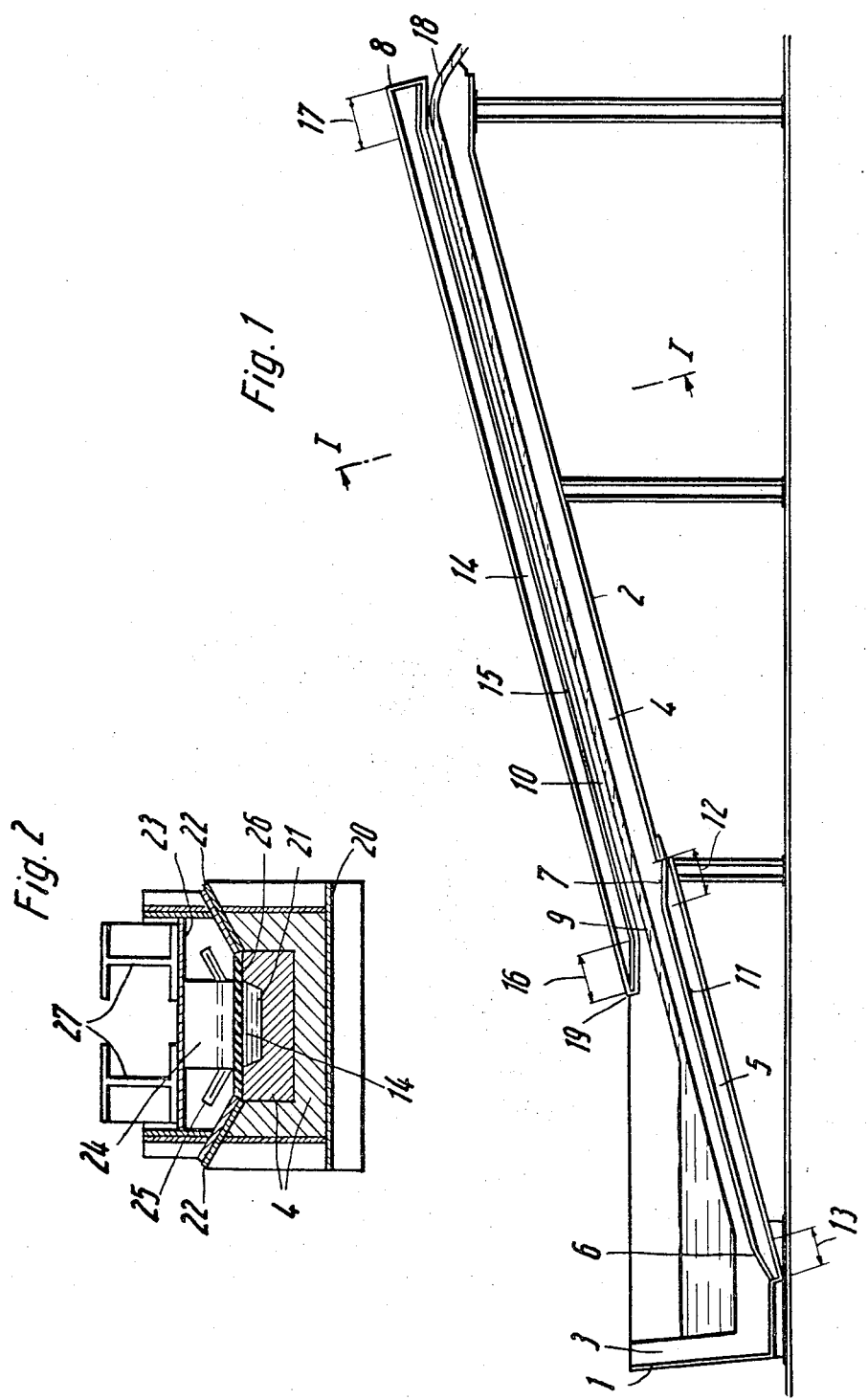

IMPROVED ELECTROMAGNETIC CONVEYOR TROUGH

The invention relates to an electromagnetic conveyor trough of the type having a chute body ascending obliquely from a metal reservoir. Liquid metal is transported along the trough which, under the effect of an electromagnetic travelling field, from the reservoir in open flow uphill to flow out at the upper end of the chute. A multiphase, linear travelling field inductor which generates the travelling field is usually arranged underneath the refractory chute body so as to extend with its end on the reservoir side far enough in the direction of or underneath the reservoir so that the metal, even at lowest bath level in the reservoir at which transport is to be carried out, reaches into the conveying range of the inductor.

One such eletromagnetic conveyor chute is disclosed in general in U.S. Pat. No. 3,554,670. The travelling field inductor arranged underneath the chute body in that structure permits satisfactory withdrawal at widely varying levels of metal in the reservoir, with the quantities of metal withdrawn per unit of time at a constant travelling field intensity varying only slightly with the level of the metal bath in the reservoir.

In order to safely operate an electromagnetic conveyor chute of this type, a minimum thickness of refractory lining is conventionally required in the chute body at the bottom of the conveyor duct for the liquid metal. However, this minimum thickness – when the travelling field inductor is arranged underneath the conveyor duct — necessitates in practice a relatively great separation between the liquid metal flowing up the chute body and the effective inductor surface. Since the efficiency of conveying diminishes approximately exponentially with this distance, for a conveyor chute with an inductor arranged underneath to produce a reasonable conveying performance, a relatively high electric power input is required. Further, since the power factor of conveyor chutes is very low, the capacitor batteries needed for the power factor correction represent a considerable expense. This disadvantage of disposing the inductor underneath the chute body makes itself felt in particular in conveyor chutes for liquid pig iron and steel, since, to ensure sufficient operational safety and an adequate heat insulation, the minimum thickness of the lining on the bottom of the chute has to be particularly great and for conveyor chutes serving for metal transport over greater distances, the inductors have to be particularly long.

As indicated in the introduction to the above-mentioned U.S. patent, it has proposed for these reasons to arrange the travelling field inductor above the conveyor chute. This design has the advantage that the mean distance between the metal transported and the effective inductor surface can be reduced to a relatively small safety distance, and at least in principle a substantial improvement of conveying efficiency can be achieved. At the same time, the operational safety can also be increased, since the refractory lining of the chute-shaped conveyor channel can be made in any desired thickness. It has been found, however, that conveyor chutes with travelling field inductors placed above them cannot be readily connected to storage tanks, in which, as is the case e.g. in melting and holding furnaces, the filling level of the liquid metal is subject to substantial variations. In the case of great differences in the bath levels no metal will be in the range of the travelling field generated by the inductor when the bath level is too low. Further, the bath level must not rise too high so as to avoid a possible dipping of the inductor into the liquid metal.

It is the object of the invention to provide an electromagnetic conveyor chute for transporting liquid metals, particularly pig iron and steel, comprising an obliquely rising chute body connected to a metal reservoir and a multi-phase travelling field inductor arranged underneath the chute body with an inductor underneath the conveyor channel are largely maintained, and the disadvantages of the known conveyor chute of this type are largely avoided.

This object is achieved in that the travelling field inductor arranged underneath the conveyor duct extends from the chute inlet side in the direction toward the upper end of the chute to at least one pole pitch beyond that part of the conveyor duct to which, at maximum metal level extends into the conveyor duct. Also, in the region above the maximum metal level in the reservoir and above the conveyor duct, a second linear travelling field inductor is disposed, extending to the upper end of the chute, so that the travelling field of the second inductor follows the field of the first inductor which is arranged underneath the conveyor duct or, especially with its starting region overlapping the end region of the field of this first inductor, continues the same up to the top end of the chute.

In a particularly advantageous embodiment of this invention, the effective inductor area of the first inductor underneath the conveyor duct has in the region of its upper edge pole — as described in the above-mentioned U.S. patent — a smaller mean gradient to the horizontal than in its central region. The thickness of the refractory lining at the bottom of the chute, in accordance with the invention, thus rises from a small amount in the central region - starting in the region of the upper edge pole in the direction towards the top end of the chute - continuously towards the greater thickness of the chute bottom lining in the remaining upper chute region. Accordingly, the region of relatively thin chute bottom lining near the lower inductor is shortened and, by avoiding discontinuous alterations of thickness in the chute lining, the thermal stresses arising in the chute bottom lining are reduced. Since the lining in the upper region of the chute, which is free from the bottom inductor, can be pratically of any desired thickness, it can therefore be preferably made of a cheaper material than in the region of the lower inductor, reducing cost.

For assembling the second travelling field inductor above the conveyor duct, in accordance with an advantageous aspect of this invention, a base portion of the chute containing the conveyor duct is provided at its upper edges with wedge-shaped surfaces inclined towards one another. A chute lid is disposed on these surfaces embracing and supporting the upper travelling field inductor with corresponding shaped surfaces on its lower edges, and is thus centered in relation to the base portion of the chute.

A further advantageous aspect of the invention relates to a working process for controlling the amount of liquid metal transported per unit of time in the conveyor chute in accordance with the invention. For the purpose of this control the mean field intensity of the lower first travelling field inductor is controlled and the field intensity of the upper second travelling field inductor is adjusted during this control to a substantially constant value which is sufficiently high to discharge any amount of liquid metal transported by the lower inductor towards the upper end of the chute.

Since for long chutes in particular, the lower inductor is considerably much shorter in practice than the upper inductor and therefore has a substantially lower power input compared with the same, it is further advantageous in accordance with the invention that only the smaller consumer among the two inductors is designed to be controllable.

The applicant has discovered that the control of the amount of metal conveyed can be made more stable by varying the field intensity of the lower inductor rather than controlling with the upper inductor and since, in conveyor chutes with inductor arranged underneath the conveyor duct, a certain thickness of layer of the metal flow in the conveyor duct depending on the travelling field intensity and on the chute parameters will always be present. However, conveyor chutes with an inductor arranged above the conveyor duct have the tendency to fill up over the whole conveyor duct cross-section when the metal supply at the inlet is large, which can lead to an undesirable, unstable control behavior.

The invention will now be further illustrated by way of figures representing an operative embodiment.

FIG. 1 shows a schematic section of an electromagnetic conveyor chute for the transport of liquid metal, in particular of pig iron or steel.

FIG. 2 shows a view of the chute of FIG. 1 along the line 1—1 in FIG. 1 in cross-section.

A reservoir 1 terminates in an obliquely rising chute body 2 of an electromagnetic conveyor chute, the refractory lining 3 of reservoir 1 passing continuously into the lining 4 of the chute body as shown. On the inlet side of the conveyor chute underneath chute body 2, a first electromagnetic travelling field inductor 5 is arranged with its lower end 6 extending far below reservoir 1 and with its other end 7 extending in the direction towards the upper end of the chute 8 at least one pole pitch beyond point 9 which represents the point to which the liquid metal reaches farthest into conveyor duct 10 at the maximum metal level in reservoir 1 with inductor 5 off.

The effective inductor surface 11 in the region of the upper inductor edge pole 12 has a smaller gradient than in the center region of the inductor. The thickness of the refractory lining 4 increases — first following the course of the inductor surface 11 in the region of the upper edge pole 12 — from a smaller amount in the center region of the first inductor continuously towards the greater thickness of the chute bottom lining in the remaining upper region of the chute. To allow a continuous trasition of the refractory lining 4 at the chute bottom to the lining 3 of reservoir 1, as discussed in U.S. application Ser. No. 170,476 entitled "A Melting or Holding Vessel for Liquid Metals With An Adjoining Electromagnetic Conveying Trough" filed Aug. 10, 1971, the slope in the lower edge pole 13 of the travelling field inductor 5 is greater than in its central inductor region.

Above the conveyor duct 10 of the conveyor chute in the region above the maximum bath level in reservoir 1 is disposed a second travelling field inductor 14 with inductor surface 15 facing downwards, i.e., towards the conveyor duct 10. This inductor surface 15 has a smaller gradient than the mean chute gradient in the region of the lower inductor edge pole 16 as well as in that of its upper edge pole 17, following the curvature of the conveyor duct 10 at its metal outlet 18.

The end 19 at the side of the reservoir 1 of the inductor 14 overlaps the effective region of the lower inductor and continues it to the upper end of the chute.

The assembly of the upper inductor is illustrated in FIG. 2. A base portion 20 of the chute, preferably made of sheet steel, contains the refractory brickwork or lining 4 in which is recessed the conveyor duct 10 for the layer-type metal flow 21. Base portion 20 of chute 20 is provided on its upper edges with wedge-shaped surfaces 22 inclined towards one another, on which sits the chute lid 23 which has correspondingly shaped surfaces on its lower edges and which is centered in relation to the base portion 20 of the chute. In chute 20, lid 23 is mounted though the upper travelling field inductor 14, which — as customomary— comprises a magnetic sheet pack 24, into the grooves of which is inserted a multi-phase winding 25. To protect the inductor against heat radiation emitting from the liquid metal, a thermally insulating mat 26 is stretched in chute lid 23 below inductor 14. Chute lid 23, which is reinforced by T-beams 27, can be lifted off the base portion of chute 20, e.g., by means of a crane, and conveyor duct 10 can so be made accessible for cleaning and inspection purposes.

For controlling the amount of metal transported through the chute per unit of time, the average intensity of the travelling field of the inductor 5 arranged underneath the chute body is varied, e.g. by means of a regulating transformer, while the average field intensity of the second inductor 14 arranged above the conveyor duct 10 is kept constant and at a value which is high enough for its travelling field to safely discharge any of the different amounts of metal conveyed by the inductor towards the upper end of the chute 8 from where the flow out through metal outlet 18.

We claim:

1. In an electromagnetic conveyor chute for transporting liquid metals having a chute body ascending at an angle from a metal reservoir and forming a conveyor duct for the liquid metal to be transported, underneath which is disposed a multi-phase linear travelling field inductor, the inprovement wherein a first travelling field inductor arranged underneath the conveyor duct extends from the side of the chute inlet in the direction towards the upper end of the chute to at least one pole pitch beyond that point up to which the liquid metal reaches farthest into the conveyor duct at maximum metal level in the reservoir and at switched-off inductor, and wherein — in the region above the maximum metal level in the reservoir and above the conveyor duct — a second linear travelling inductor extending to the upper end of the chute is arranged, with its starting region overlapping the end region of the field of said first inductor.

2. In a conveyor chute as in claim 1, wherein the effective inductor surface of the first inductor arranged underneath the conveyor duct has in the region of its upper edge pole a smaller means gradient against the horizontal than in its center region, and that the thickness of the refractory lining at the chute bottom rises from a small value in this center region, starting in the region of the said upper edge pole in the direction of the upper chute end, steadily towards the greater thickness of the chute bottom lining in the remaining upper chute region.

3. In a conveyor chute as in claim 1 wherein a base portion of the chute containing the conveyor duct is provided on its upper edges with wedge-shaped surfaces inclined towards one another, on which sits a chute lid embracing and supporting a second travelling field inductor arranged above the conveyor duct, with correspondingly shaped surfaces on its lower edges, and is so centered in relation to the base portion of the chute.

4. An electromagnetic conveyor chute comprising:
reservoir means for holding a quantity of liquid metal over a range of depths,
means ascending from said reservoir means for guiding metal flow from said reservoir,
first inductor means extending from below said reservoir in the direction of said guiding means beneath said chute for generating a first travelling electromagnetic field for causing said liquid metal to move up said guiding means, and
second inductor means extending above said guiding means and for a distance overlapping said first inductor means for generating a second travelling electromagnetic field for causing said liquid metal to move up said guiding means.

5. A method of operating an electromagnetic conveyor chute having reservoir means for holding an quantity of liquid metal over a range of depths, means ascending from said reservoir means for guiding metal flow from said reservoir, first inductor means extending from below said reservoir in the direction of said guiding means beneath said chute for generating a first travelling electromagnetic field for causing said liquid metal to move up said guiding means, and a second inductor means extending above said guiding means, and for a distance overlapping said first inductor mean for generating a second travelling eletromagnetic field for causing said liquid metal to move up said guiding means comprising the steps of:
adjusting the field intensity of said second inductor means to a substantially constant value which is high enough to discharge any amount of liquid conveyed by said first inductor means, and
varying the field intensity of said first inductor means to cause discharge.

* * * * *